United States Patent
Baumgärtner et al.

(10) Patent No.: US 12,188,580 B2
(45) Date of Patent: Jan. 7, 2025

(54) PINCH VALVE

(71) Applicant: GEMÜ Gebr. Müller Apparatebau GmbH & Co. Kommanditgesellschaft, Ingelfingen (DE)

(72) Inventors: Michael Baumgärtner, Dörzbach (DE); Vadim Lechmann, Künzelsau (DE); Alexander Brabsche, Pfahlbach (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 17/909,552

(22) PCT Filed: Mar. 3, 2021

(86) PCT No.: PCT/EP2021/055280
§ 371 (c)(1),
(2) Date: Sep. 6, 2022

(87) PCT Pub. No.: WO2021/175900
PCT Pub. Date: Sep. 10, 2021

(65) Prior Publication Data
US 2023/0112395 A1    Apr. 13, 2023

(30) Foreign Application Priority Data
Mar. 6, 2020  (DE) .................. 10 2020 106 149.8

(51) Int. Cl.
F16K 7/06  (2006.01)

(52) U.S. Cl.
CPC .................... F16K 7/061 (2013.01)

(58) Field of Classification Search
CPC .......................................... F16K 7/061
USPC .......................................... 251/7–10
See application file for complete search history.

(56) References Cited

U.S. PATENT DOCUMENTS

| | | | | |
|---|---|---|---|---|
| 43,194 | A * | 6/1864 | Glasser | B25B 1/20 269/129 |
| 950,111 | A * | 2/1910 | Miner | F16K 7/061 251/8 |
| 2,680,000 | A * | 6/1954 | Pulver | F16K 7/061 251/8 |
| 2,825,524 | A * | 3/1958 | Fox | F16K 7/061 251/8 |

(Continued)

OTHER PUBLICATIONS

EP Office Action, Application No. 21 709 954.8-1015, dated Oct. 12, 2023, pp. 1-12.

(Continued)

*Primary Examiner* — Daphne M Barry
(74) *Attorney, Agent, or Firm* — BOND, SCHOENECK & KING, PLLC; George R. McGuire

(57) ABSTRACT

The invention relates to a pinch valve that includes: a main body having a receiving space for a tube section, wherein the receiving space comprises a lateral opening of the main body; a counter-bearing section for a compressor that moves along a actuating axis; and a closure element which is movably fastened to the main body and which is movable relative to the main body between a first position, in which the closure element closes the lateral opening of the main body at least in sections, and a second position, in which the closure element exposes an insertion opening for the tube section.

13 Claims, 8 Drawing Sheets

(56) References Cited

U.S. PATENT DOCUMENTS

| | | | | |
|---|---|---|---|---|
| 3,544,060 | A | * | 12/1970 | Demler, Sr. ........ A61M 5/16881 248/229.15 |
| 4,337,791 | A | * | 7/1982 | Tech ................... A61M 39/286 251/8 |
| 4,807,845 | A | * | 2/1989 | Darnell ................ A61M 39/28 251/5 |
| 4,978,100 | A | * | 12/1990 | Peurifoy ................ F16K 7/061 269/127 |
| 8,491,542 | B2 | * | 7/2013 | Coon ................... A61M 39/286 251/294 |
| 11,614,172 | B2 | * | 3/2023 | Irish ....................... F16K 7/061 251/7 |
| 11,692,633 | B2 | * | 7/2023 | Borchert ............ A61M 39/284 251/9 |
| D1,003,397 | S | * | 10/2023 | Baumgaertner ............ D23/233 |
| D1,003,398 | S | * | 10/2023 | Baumgaertner ............ D23/233 |
| 2001/0019117 | A1 | | 9/2001 | Schoeb |
| 2007/0102658 | A1 | * | 5/2007 | Grimes .................. F16K 7/063 251/9 |
| 2009/0101861 | A1 | | 4/2009 | Feast |
| 2012/0018654 | A1 | * | 1/2012 | Wennberg ................ F16K 7/06 251/9 |
| 2017/0254423 | A1 | * | 9/2017 | Mueller .................. F16K 7/061 |
| 2018/0015526 | A1 | * | 1/2018 | Brown ................ B21D 39/046 |
| 2023/0077009 | A1 | * | 3/2023 | Mayr .................... A61M 39/28 |

OTHER PUBLICATIONS

International Search Report and Written Opinion of PCT/EP2021/055280, filed Mar. 3, 2021. pp. 1-9.

International Search Report of Priority Application DE 10 2020 106 149.8, filed Mar. 6, 2020. pp. 1-7.

Translated EP Office Action, Application No. 21 709 954.8, dated Mar. 4, 2024, pp. 1-9.

* cited by examiner

PINCH VALVE

CROSS-REFERENCE TO RELATED APPLICATION(S)

This application is the United States National Phase application filed under 35 U.S.C. 371 of International Application No. PCT/EP2021/055280, filed Mar. 3, 2021, which claims priority to German Patent Application No. 10 2020 106 149.8 filed with the German Patent Office on Mar. 6, 2020, the entirety of each of which is hereby incorporated by reference.

BACKGROUND

The invention relates to a pinch valve for pinching a tube section.

Tube pinch valves for compressing tube sections are generally known.

SUMMARY OF THE INVENTION

The object that the invention is based on is achieved by a pinch valve.

One aspect of the description relates to a pinch valve comprising: a main body with a receiving space for a tube section, wherein the main body has a lateral opening that leads into the receiving space; a closure element which is movably fastened to the main body and which moves relative to the main body between a first position, in which the closure element closes the lateral opening of the main body at least in sections, and a second position, in which the closure element exposes an insertionf opening for the tube section; and a counter-bearing section for a compressor that moves along a actuating axis.

Lateral insertion or removal of the tube section via the insertion opening is made possible. Advantageously, the pinch valve makes it possible to decouple the fixing of the tube section in the pinch valve from a fastening of the pinch valve itself and from an arrangement of a drive. In particular, a replacement of a drive or a disassembly for changing the tube section can be omitted. The handling of the pinch valve is thus improved.

The correct compression of the tube line or the tube section is reliably achieved when the tube section is correctly positioned between the compressor and the counter-bearing section. This means that when the tube section is not correctly positioned in the receiving space, the process fluid can freely flow in the tube, regardless of the state of the pinch valve (e.g., open or closed). Furthermore, if this is the case, the controller of a fluid control system can continue to operate under the wrong assumption that the flow through the tube is obstructed when the pinch valve is closed. In this case, the control of the process fluid is impaired by the system. As long as the tube is not correctly positioned in the tube slot or the receiving space, the fluid control system cannot function properly. The closure element eliminates the problems mentioned above and increases the process reliability.

An advantageous example is characterized in that the closure element is fastened to the main body so as to be rotatable about an axis of rotation.

Advantageously, the main body and the closure element are thus connected to one another in a hinge region. It is thus possible for the closure element to be folded together with the tube section held by the closure element. This means that the tube section is introduced into the squeezing chamber in a controlled manner and can be removed from said chamber. The handling of the pinch valve improves. At the same time, the controlled accommodation of the tube section increases the process reliability.

One advantageous example is characterized in that the axis of rotation extends perpendicularly and at a distance from the actuating axis.

This way, the tube section can advantageously be removed or supplied perpendicularly to the actuating axis during maintenance. A further unnecessary curvature of the tube section is avoided.

One advantageous example is characterized in that an opening angle between the first and the second position of the closure element is limited to a range between 40° and 80°, in particular to a range between 50° and 60°.

This range of the opening angle makes it easy for the operating staff to replace the tube section since the tube section is secured by the closure element which is semi-opened in this manner and thus easy to replace. In addition, the closure element thus serves as a protective measure against any unintentional engagement in the region of the compressor.

One advantageous example is characterized in that the closure element provides a counter-bearing section for a compressor that moves along the actuating axis.

The provision of the counter-bearing section by means of the closure element simplifies handling, for example in that the insertion opening is easily released with one hand and a replacement of the tube section is made possible.

One advantageous example is characterized in that the closure element and/or the counter-bearing section comprises at least one stop region for limiting a movement of the compressor along the actuating axis and in the direction of the counter-bearing section.

The stop region advantageously allows for a controlled compaction of the tube section since a position defined by the stop region is not exceeded by the compressor.

One advantageous example is characterized in that the closure element is detachably connected to the main body.

By means of the detachable connection, set-up times required for an application change, which requires, for example, a change in the type of the tube section, a change in the compressor geometry and/or a change in the counter-bearing geometry, can be reduced. A disassembly of the drive, a loosening of the fastened pinch valve or a replacement of the entire pinch valve can be omitted.

At the same time, a thus possible adaptation of the counter-bearing geometry by the operating or maintenance personnel leads to a preservation of the tube section to be pinched. This results in a reduced probability of damage, thereby reducing the delivery of particles of the tube section to the process fluid as well. This results in increased process reliability.

One advantageous example is characterized in that the counter-bearing section and the closure element are formed in one piece.

The design of the pinch valve is advantageously simplified, wherein the counter-bearing section is replaced together with the flap. In particular, degrees of freedom result in the identification of the closure element in order to indicate a predetermined application for the operating personnel. This improves operability and maintainability.

One advantageous example is characterized in that the counter-bearing section is detachably connected to the closure element.

A modular pinch valve is thus created and makes it possible for the closure element to remain for the next insert and for only the counter-bearing section to be replaced. This can lead to reduced manufacturing costs with simultaneously increased degrees of freedom in application.

One advantageous example is characterized in that a contact contour of the closure element opposite the counter-bearing section and an inner contact contour of the main body rest against one another when the closure element is in the first position.

If the compressor presses onto the tube section or the stop region, a force is transmitted to the main body via the closure element. The transmission of the force by means of the contact reduces the stress on the type of movably formed fastening between the closure element and the main body. Advantageously, a force transmission along and parallel to the actuating axis is thus improved. In particular the hinge benefits therefrom since the forces are preferably transmitted via the radially further inward contact contours.

One advantageous example is characterized in that a locking element which is movably fastened to the main body is movable relative to the main body between a release position, in which the locking element allows for a movement of the closure element to the second position thereof, and a locking position, in which the locking element limits a movement of the closure element out of the first position thereof.

The locking element prevents the tube section from being unintentionally removed during the operation of the pinch valve.

One advantageous example is characterized in that the locking element is rotatably mounted about the actuating axis, that a collar of the locking element in the locking position fixes a distal section of the closure element, and that a recess of the collar of the locking element in the release position releases the distal section of the closure element to move the closure element to the second position.

Advantageously, a locking element that is easy to operate and the recess of which represents a visual indication for the locking or release, is thus provided.

One advantageous example is characterized in that the compressor is detachably fastened to a valve rod extending along the actuating axis.

It is thus advantageously possible to adapt the compressor geometry to different tube configurations.

One advantageous example is characterized in that a fastening section of the main body is located radially outside of a passage opening for a valve rod.

In conjunction with the tube changing mechanism, this fastening section advantageously provides for clean/gray room separation. The part of the pinch valve for receiving the tube is located in the clean room. A drive, on the other hand, can be arranged in the gray room. This reduces the cleaning effort. At the same time, the demands on the drive are reduced.

One advantageous example is characterized in that the counter-bearing section opens in an opening which has a smaller diameter than an inner diameter of the counter-bearing section.

The counter-bearing section advantageously fixes the tube section due to the tapered opening and prevents the tube section from unintentionally falling out.

DETAILED DESCRIPTION

Figure 1:
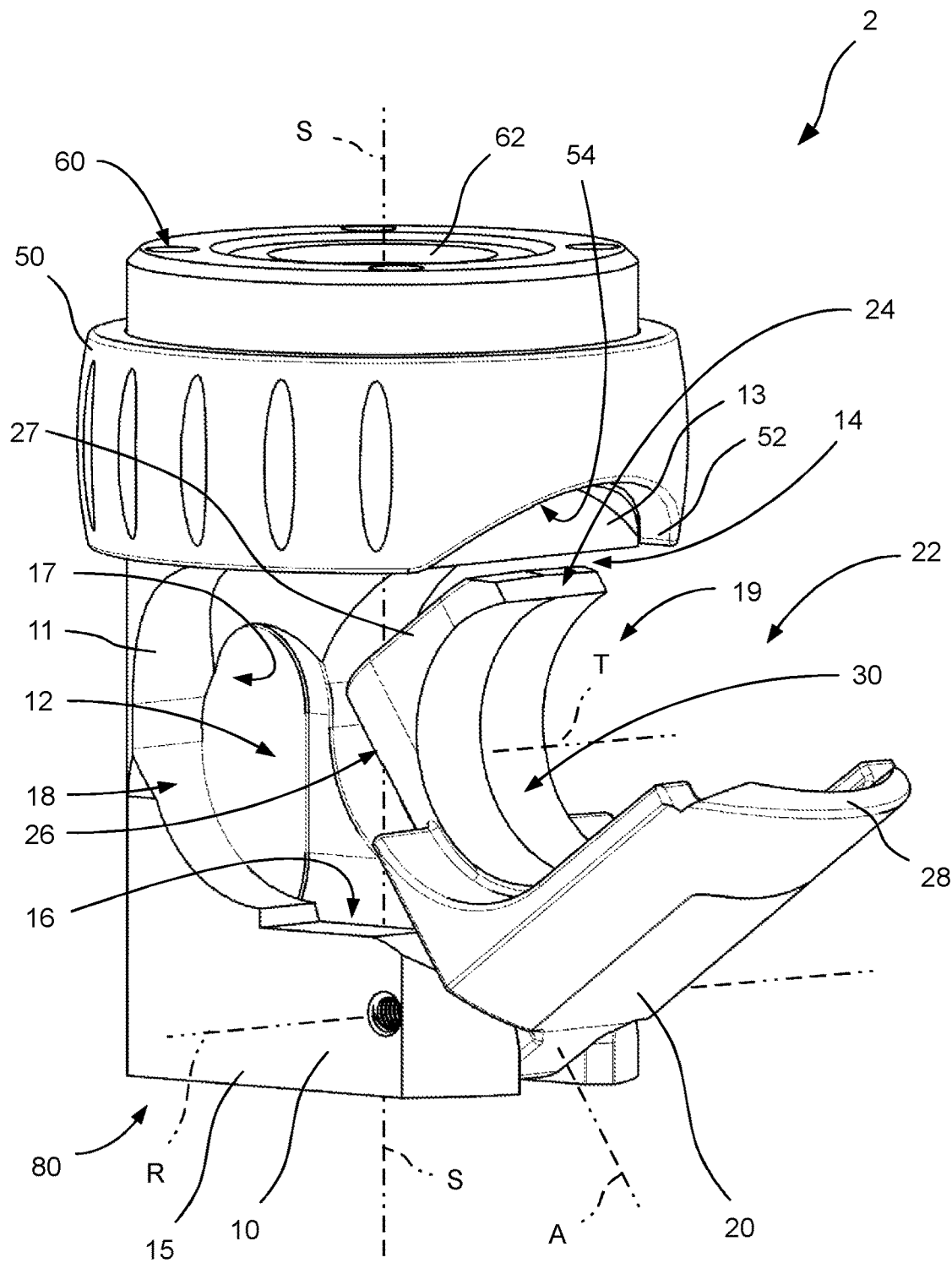
FIG. 1 a perspective view of a pinch valve.

FIG. 1 shows a perspective view of a pinch valve 2. A main body 10 comprises a receiving space 12 for a tube section in which a process medium flows. The main body 10 comprises two opposite openings 18 and 19 and a lateral opening 14. The opposite openings 18 and 19 form a passage opening and serve to receive the tube section extending along a tube axis T. The lateral opening 14 leads from the outside into the receiving space 12. The lateral opening 14 serves to remove and supply the tube section. The receiving space 12 is thus delimited by the main body 10. The main body 10 is U-shaped.

A counter-bearing section 30 is provided and serves as a counter bearing for a compressor that moves along a actuating axis S.

A flap-like closure element 20 which is movably fastened to the main body 10 is movable relative to the main body 10 between a first position (not shown in FIG. 1), in which the closure element 20 closes the lateral opening 14 of the main body 10 at least in sections, and a second position (shown in FIG. 1), in which the closure element 20 exposes an insertion opening 22 for the tube section. The insertion opening 22 can also be referred to as an insertion and removal opening.

The flow of the process fluid flowing in the tube section which is inserted into the pinch valve 2 is influenced by the compressor pressing along the actuating axis from one side onto the tube section. The counter-bearing section 30 is fixedly in contact with the side of the tube section opposite the compressor. If the compressor now presses onto the flexible tube section, the internal diameter of the tube section decreases and thus limits the flow of the process fluid. The counter-bearing section 30 can also be referred to as a contact section.

The main body 10, which is U-shaped at least in sections, comprises a lateral connecting section 11 which extends substantially in parallel to and at a distance from the actuating axis S. Two sections 13 and 15, which are spaced apart from one another and extend substantially perpendicularly to the actuating axis S, project from the connecting section 11. The connecting section 11 and the sections 13 and 15 projecting from the connecting section 11 delimit the receiving space 12.

The lateral opening 14 is delimited by the main body 10, in particular by the distal ends of the sections 13 and 15. The insertion opening 22 is delimited jointly by the closure element 20 and the main body 10 or by the elements arranged on the main body 10.

The closure element 20 is fastened to a distal region of the section 10 of the main body 10 so as to be rotatable about an axis of rotation R. The axis of rotation R extends perpendicularly to and at a distance from the actuating axis S.

In the example shown, the closure element 20 provides the counter-bearing section 30. The counter-bearing section 30 is formed integrally with the closure element 20. As a result of the integral design, the closure element 20 provides the receptacle for the tube section. This means that the closure element 20 moves the tube section between a removal or insertion position shown in FIG. 1 and an operating position. A screw connection extending along the axis of rotation R allows for the closure element 30 to be replaced. The closure element 20 is thus detachably connected to the main body 10.

In one example (not shown in FIG. 1) of the pinch valve 2, the counter-bearing section 30 is detachably connected to the closure element 20. The separately designed counter-bearing section 30 is, for example, connected to the closure element along an axis A extending perpendicularly to and at a distance from the axis of rotation R. The connection between the counter-bearing section 30 and the closure element 20 is designed, for example, as a dovetail connection.

The closure element 20 and/or the counter-bearing section 30 comprise at least one stop region 24 for limiting a movement of the compressor along the actuating axis S and in the direction of the counter-bearing section 30.

A contact contour 26 of the closure element 20 opposite the counter-bearing section 30 and an inner contact contour 16 of the main body 10 rest against one another when the closure element 20 is in the first position. The contact contour 16 comprises, for example, a cylindrical inner surface with an imaginary cylinder axis which extends perpendicularly and through the actuating axis S. Accordingly, the contact contour 26 has a cylindrical outer surface with an imaginary cylindrical axis, which extends perpendicularly and through the actuating axis S when the closure element 20 is in the first position.

Furthermore, the closure element 20 comprises a contact contour 27 which projects into the receiving space 12 and, when the closure element 20 is in the first position, rests on a contact contour 17 of the connecting section 11.

A locking element 50 which is movably fastened to the main body 10 is movable relative to the main body 10 between a release position, in which the locking element 50 allows for a movement of the closure element 20 to the second position thereof, and a locking position, in which the locking element 50 limits a movement of the closure element 20 out of the first position thereof. The locking element 50 is rotatably mounted about the actuating axis S. A collar 52 of the locking element 50 projecting in the direction of the receiving space 12 fixes a distal section 28 of the closure element 20 in the locking position. In the release position, a recess 54 of the collar 52 of the locking element 50 releases the distal section 28 of the closure element 20 to move the closure element 20 to the second position. An angle of rotation of the locking element 50 is substantially 90°. In the end positions, a locking mechanism secures the locking element 50 against an unintentional rotation.

A fastening section 60 of the main body 10 is located radially outside a passage opening 62 for a valve rod. The fastening section 60 is provided in FIG. 1 by internal threads which open in distal openings.

A further fastening section 80 is located on the side of the pinch valve 2 opposite the passage opening 62 and is formed, for example, by internal threads which open in distal openings.

In one example, the main body 10, the closure element 20, the counter-bearing section 30 and the locking element 50 are manufactured from a respective plastic. In another example, the aforementioned components are manufactured from a respective metal alloy. In a further example, the aforementioned components are manufactured from a metal alloy or a plastic.

Figure 2A:
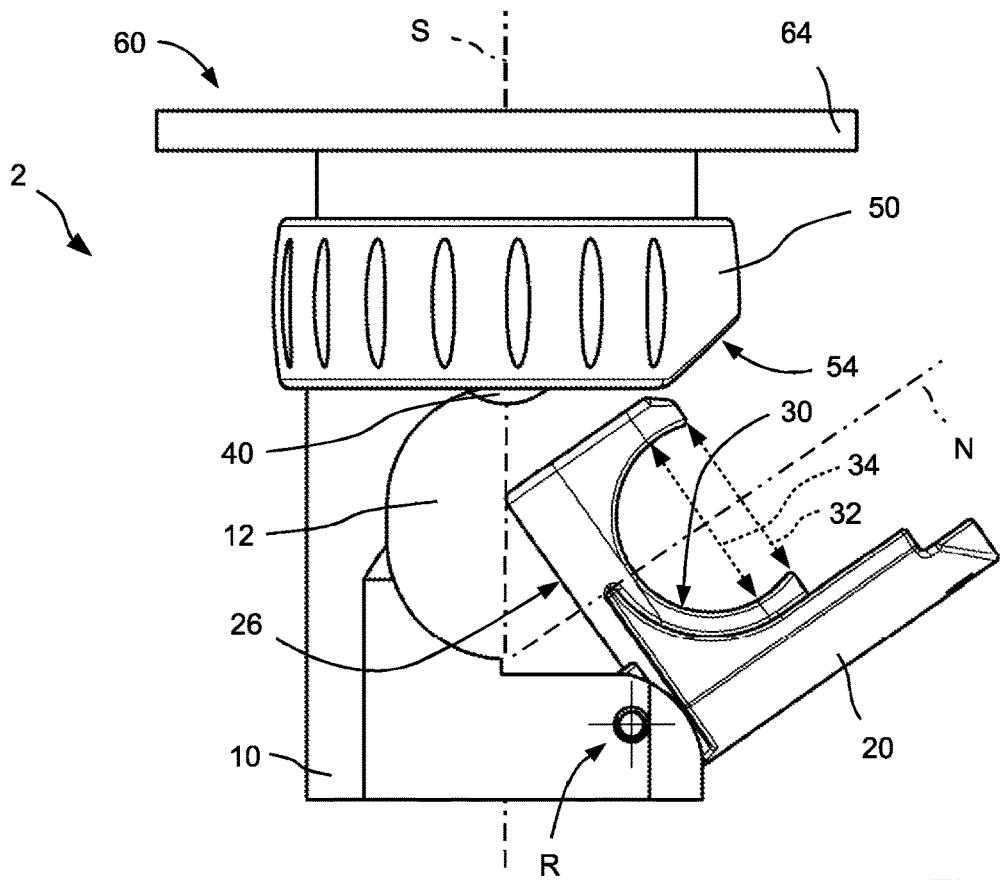
FIGS. 2*a*, 3*a*, 6*a*, 7*a* the pinch valve with a closure element in a second position.
Figure 2B:
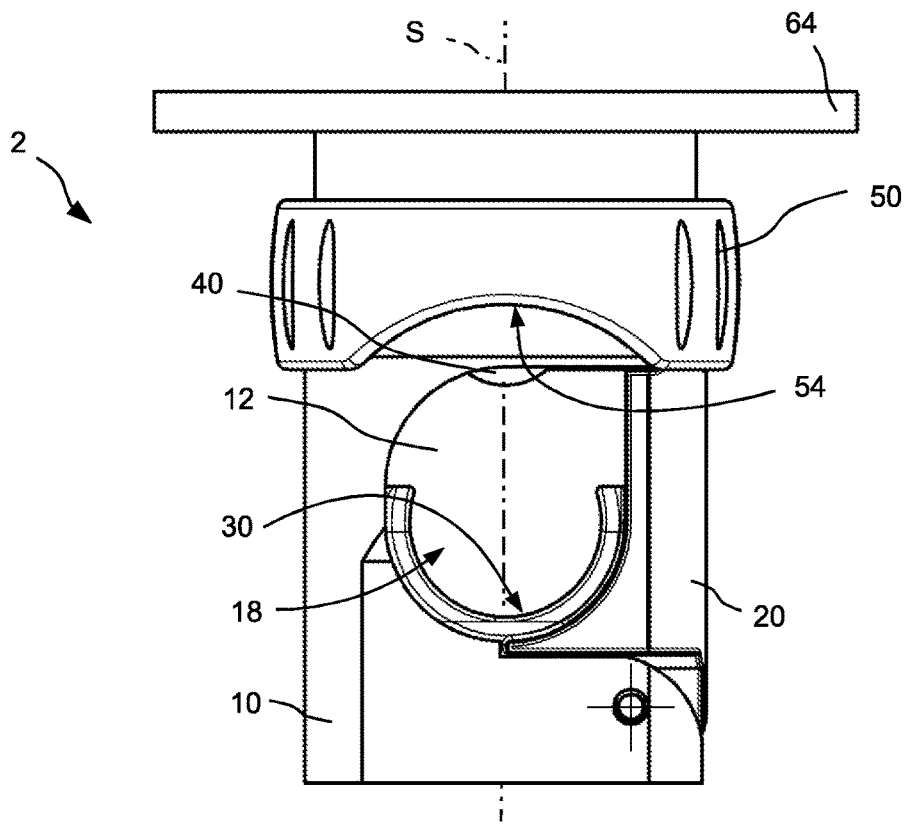
FIGS. 2*b*, 3*b*, 6*b*, 7*b* the pinch valve with the closure element in a first position.

FIGS. 2a and 2b show the pinch valve 2 from FIG. 1 with the closure element 20 in different positions, with the tube axis extending perpendicularly to the plane of the drawing.

The counter-bearing section 30 opens in an opening which has a smaller diameter 32 extending perpendicularly to the tube axis than an inner diameter 34 of the counter-bearing section 30 extending perpendicularly to the tube axis.

The fastening section 60 of the pinch valve 2 comprises a flange 64 in which internal threads extending in parallel to the actuating axis S are formed.

An opening angle between the first and the second position of the closure element 20 is limited to a range between 40° and 80°, in particular to a range between 50° and 60°. The opening angle results, for example, between an inclination axis N of the closure element 20 and the actuating axis S.

In the first position, which is shown in FIG. 2b, the locking element 50 is rotated out of its release position and into the locking position such that the concavely curved recess 54 visually delimits the opening 18 of the receiving space for the tube section. This means that, in the locking position, the visual impression arises that the recess 54 delimits an imaginary enlarged outer contour of the tube section.

Figure 3A:
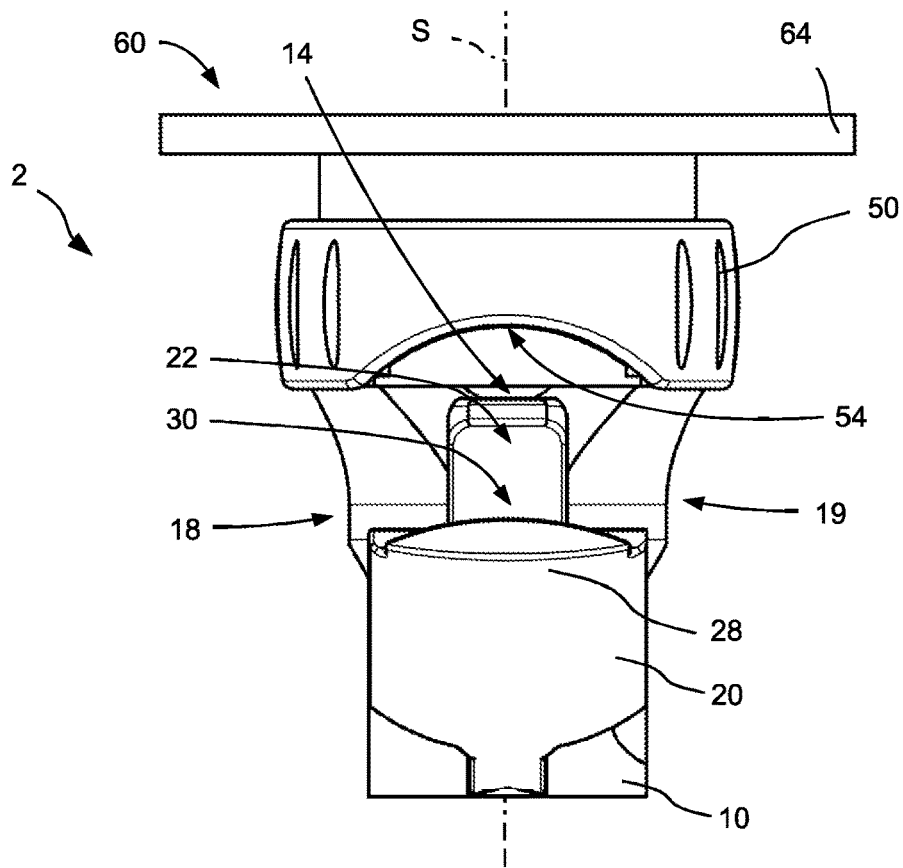
Figure 3B:
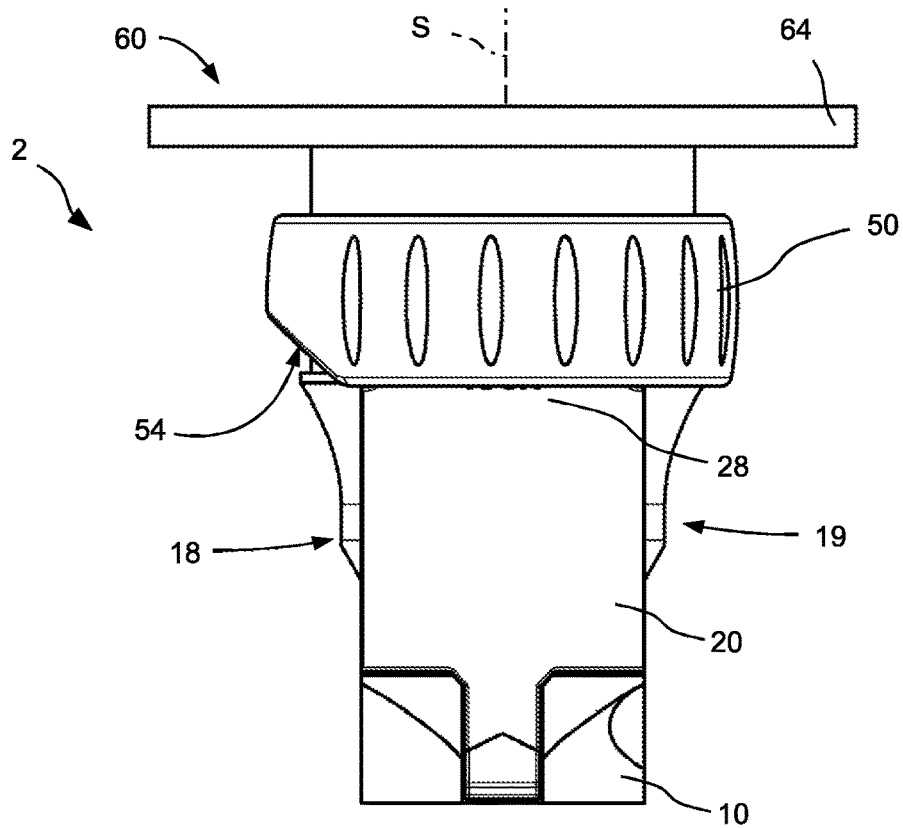

FIGS. 3a and 3b show the pinch valve 2 from FIG. 1 with the closure element 20 in different positions, with the tube axis extending in parallel to the plane of the drawing.

Figure 4:
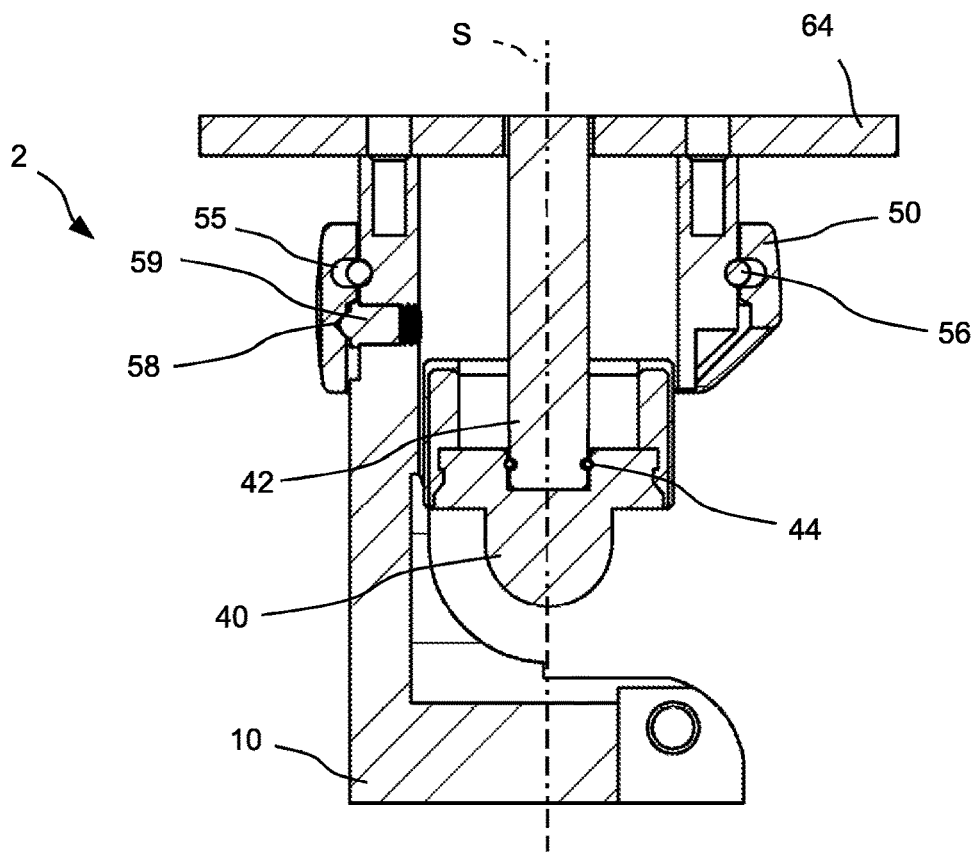
FIG. 4 a section of the pinch valve without a closure element.

FIG. 4 shows a section of the pinch valve 2 without the closure element. The compressor 40 can be replaced without the attached closure element. For this purpose, the compressor 40 is detachably fastened to a distal end of the valve rod 42 extending along the actuating axis S. On the distal end of the valve rod 42, a round-wire snap ring 44 is accommodated on the circumferential side in a circumferential groove. The compressor 40 comprises an inner groove in which the round-wire snap ring 44 is accommodated. When the compressor 40 is pulled manually, the round-wire snap ring 44 contracts and releases the compressor 40.

The locking element 50 comprises an inner groove 55, into which a ring 56, which is arranged in an outer groove of the main body 10, engages. The locking element 50 is thus forced into a rotational movement about the actuating axis S.

Furthermore, the locking element 50 comprises an inner latching recess 58 which engages in at least two latching elements 59 projecting from the main body 10, when the locking element 50 is rotated. The at least two latching elements 59 define the locking position and the release position of the locking element 50.

Figure 5:
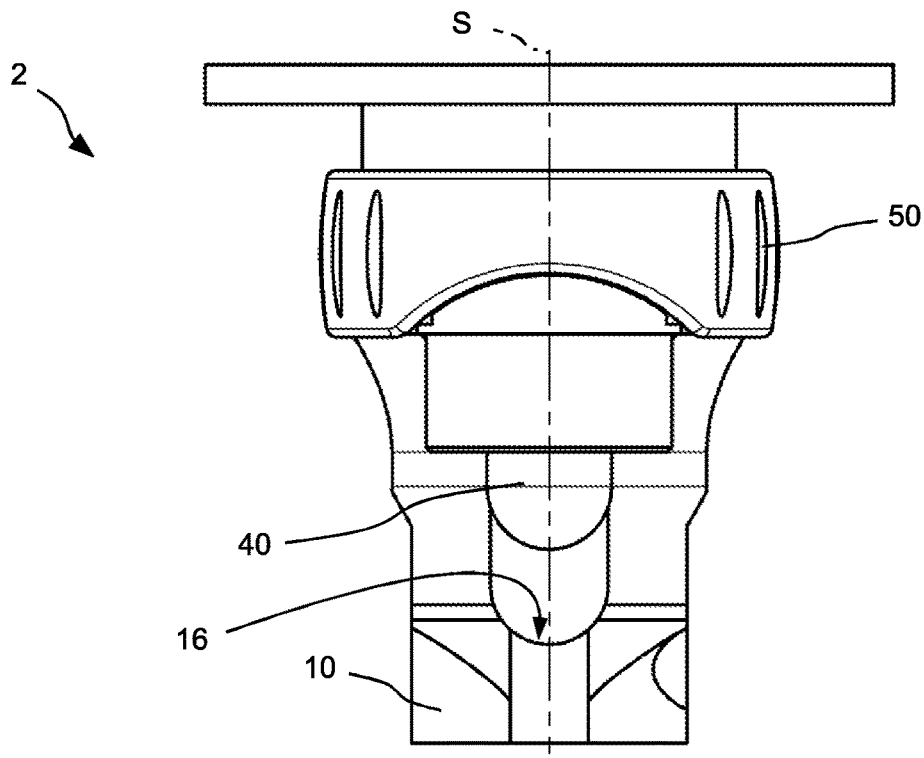
FIG. 5 a side view of the pinch valve without the closure element.

FIG. 5 shows a side view of the pinch valve 2 without the closure element 20. The contact contour 16 for the contact of the closure element has an inner cylindrical contact surface.

Figure 6A:
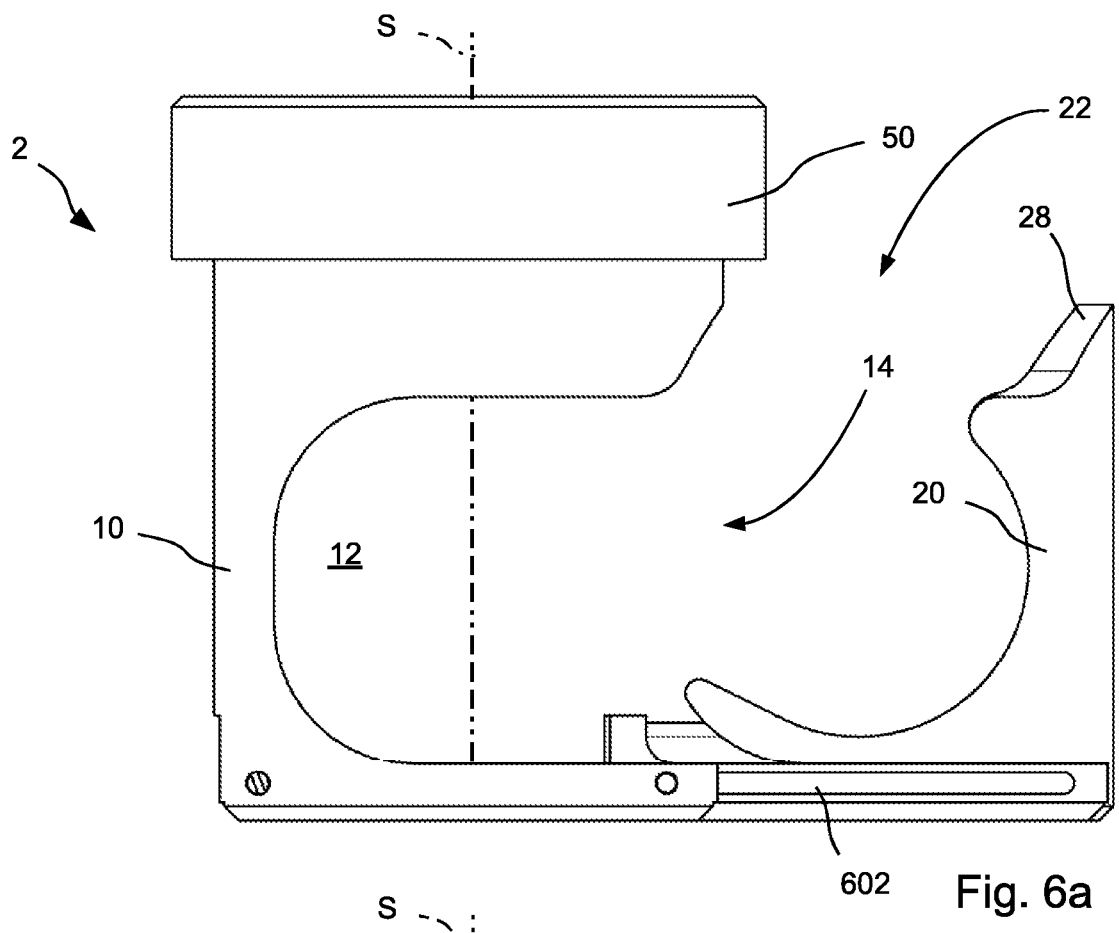
Figure 6B:
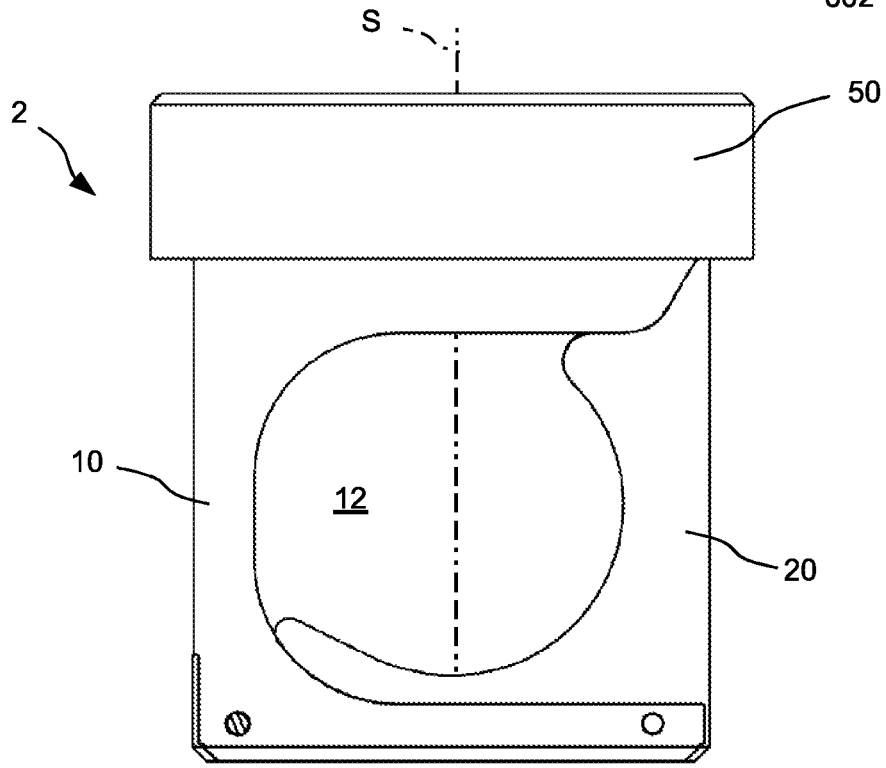

FIGS. 6a and 6b show an example of the pinch valve 2 with the closure element 20 in different positions. The closure element 20 is designed like a drawer and comprises a guide section 602 which is accommodated in a guide section of the main body 10 accommodating said guide section. The closure element 20 is thus linearly guided.

The second position shown in FIG. 6a facilitates the insertion of the tube section via the insertion opening 22. The first position of the closure element 20 shown in FIG. 6b closes the opening 14 of the main body 10.

The locking element 50 can be designed as shown in the preceding examples. In another example, the locking element 50 is displaced in parallel to the actuating axis S and locks the closure element 20.

Figure 7A:
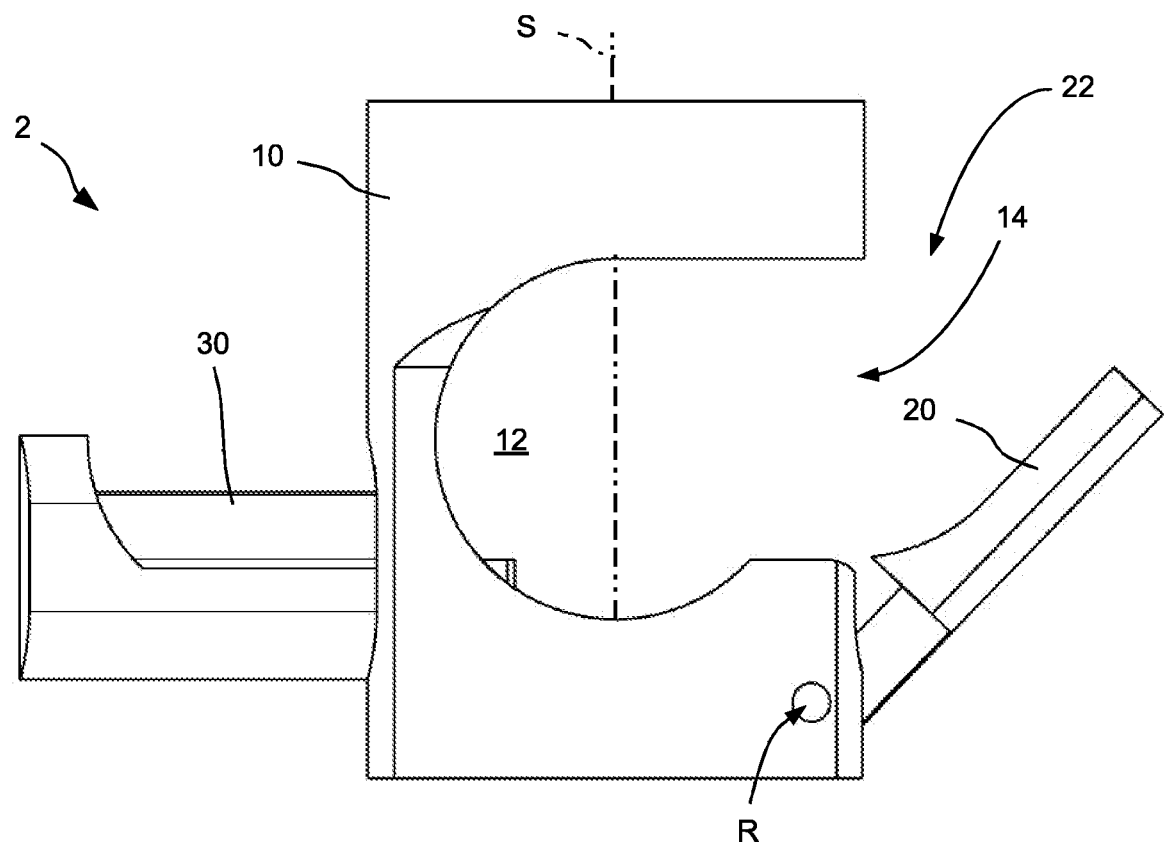
Figure 7B:
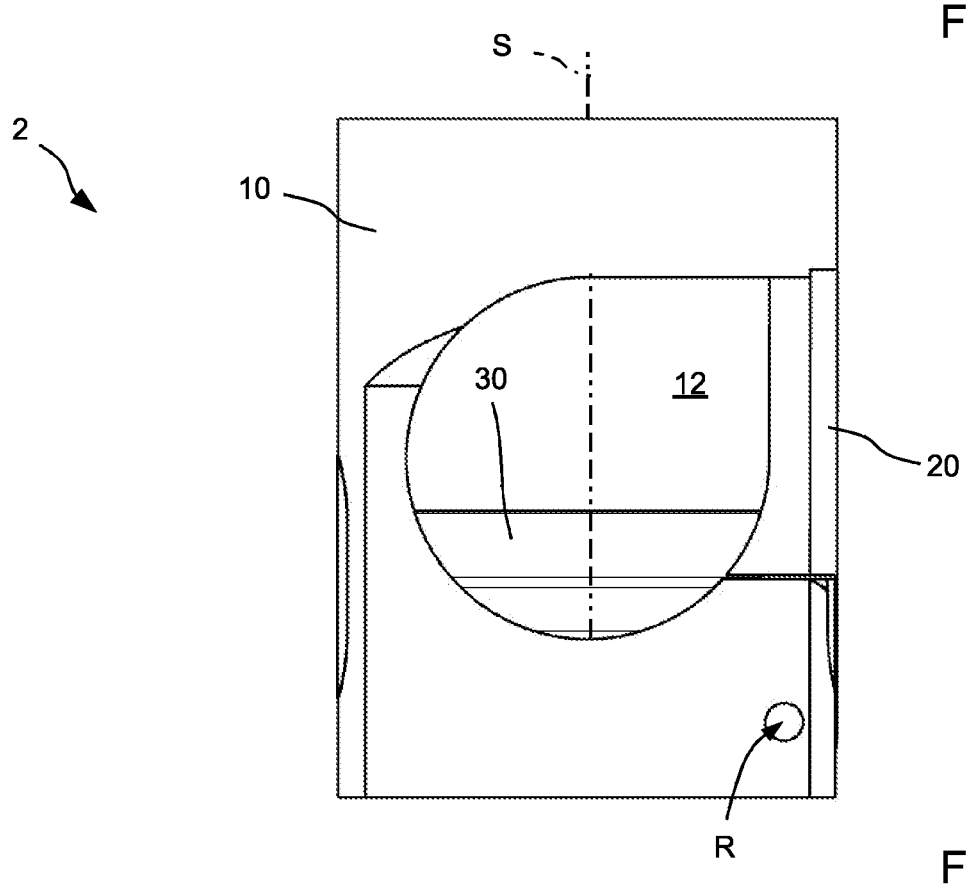

FIGS. 7a and 7b show an example of the pinch valve 2 with the closure element 20 in different positions. In this example, the closure element 20 and the counter-bearing section 30 are designed to be separate and are each movably fixed to the main body 10. The closure element 20 is rotatable about the axis of rotation R. The counter-bearing section 30 is mounted in such a way that it can be pushed through a passage opening in the main body 10 into the receiving space 12.

In one example (not shown), the pinch valve 2 comprises a plurality of counter-bearing sections which are arranged in particular at a distance from one another along the actuating axis S in the first position of the closure element 20. A compressor assigned to the respective counter-bearing section moves along the common actuating axis S. Of course, the compressor/counter-bearing section pairs can also be arranged at an offset from one another. In one example, the plurality of the compressors is driven by means of a single drive, wherein the plurality of the compressors is connected to one another by means of lateral force-transmission sections which extend in parallel to but at a distance from the actuating axis S. Advantageously, a plurality of tube sections can thereby be operated by means of a single pinch valve.

In one example (not shown), a plurality of closure elements 20 of one or more pinch valves 2 are connected to one another by means of one or more connecting elements such that the closure elements 20 can be moved together between the first and the second position. Advantageously, a plurality of closure elements 20, which expose a respective insertion opening, can thus be operated simultaneously.

Figure 8:
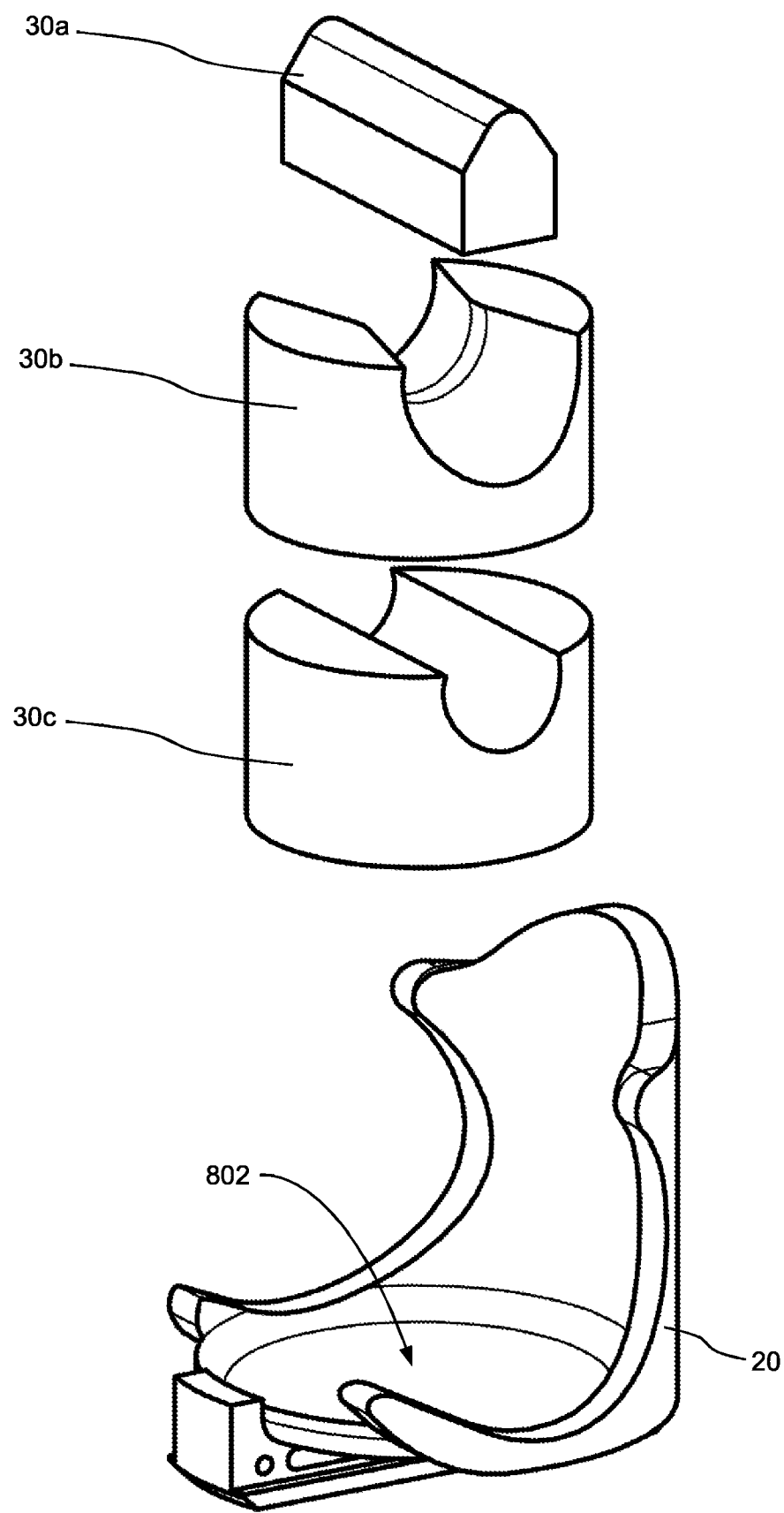
FIG. 8 the closure element with different inserts.

FIG. 8 shows the closure element 20 from FIGS. 6a and 6b with different inserts which serve as respective counter-bearing section 30a, 30b, 30c for the compressor. A receiving section 802 of the closure element 20 accommodates one of the counter-bearing sections 30a, 30b, 30c.

Figure 9:
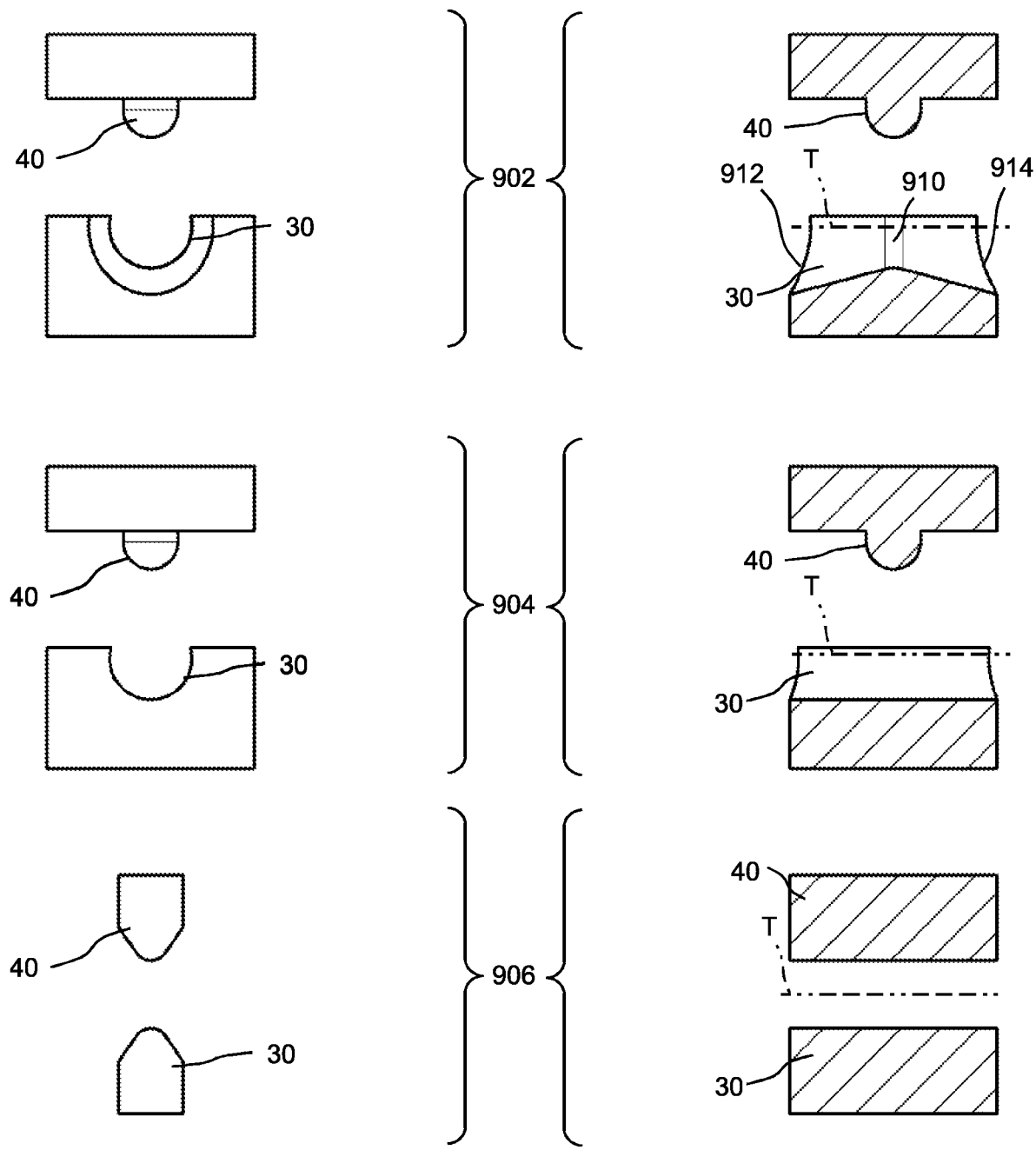
FIG. 9 a plurality of compressor/counter bearing pairs.

FIG. 9 shows a plurality of compressor/counter bearing pairs 902, 904, 906, showing, on the left side, the tube center axis T extending perpendicularly to the plane of the drawing and, on the right side, a section along the tube center axis T.

The compressor/counter bearing pair 902 comprises the hemispherical compressor 40. The counter-bearing section 30 comprises a substantially circular counter surface 910 opposite the compressor 40. Starting from the distal openings 912, 914 of the counter-bearing section, the receiving channel is tapered to receive the tube section toward the counter surface 910.

The compressor/counter bearing pair 904 comprises the hemispherical compressor 40. The counter-bearing section 30 comprises the receiving channel that extends along the tube axis T and follows a cylindrical inner surface.

The compressor/counter bearing pair 906 comprises a wedge-like compressor 40 and a wedge-like counter-bearing section 30. The compressor 40 and the counter-bearing section 30 lead to a guillotine-like clamping of the tube section, which means that the clamping takes place substantially perpendicularly to the tube axis T.

What is claimed is:

1. A pinch valve comprising:
   a main body having a receiving space for a tube section, the main body comprising a lateral opening that leads into the receiving space;
   a counter-bearing section for a compressor that moves along an actuating axis; and
   a closure element that is movably fastened to the main body and that is movable relative to the main body between a first position, in which the closure element closes the lateral opening of the main body at least in sections, and a second position, in which the closure element exposes an insertion opening for the tube section,
   wherein the lateral opening is radially spaced apart from the actuating axis,
   wherein a locking element which is movably fastened to the main body is movable relative to the main body between a release position, in which the locking element allows for a movement of the closure element to the second position thereof, and a locking position, in which the locking element limits a movement of the closure element out of the first position thereof, and
   wherein the locking element is rotatably mounted about the actuating axis, wherein a collar of the locking element fixes a distal section of the closure element in the locking position, and wherein a recess of the collar of the locking element in the release position releases the distal section of the closure element to move the closure element to the second position.

2. The pinch valve according to claim 1, wherein the closure element is fastened to the main body so as to be rotatable about an axis of rotation.

3. The pinch valve according to claim 2, wherein the axis of rotation extends perpendicularly to and at a distance from the actuating axis.

4. The pinch valve according to claim 2, wherein an opening angle between the first and the second position of the closure element is limited to a range between 40° and 80°.

5. The pinch valve according to claim 1, wherein the closure element provides the counter-bearing section.

6. The pinch valve according to claim 1, wherein the closure element and/or the counter-bearing section comprises at least one stop region for limiting a movement of the compressor along the actuating axis and in the direction of the counter-bearing section.

7. The pinch valve according to claim 1, wherein the closure element is detachably connected to the main body.

8. The pinch valve according to claim 1, wherein the counter-bearing section and the closure element are integrally formed.

9. The pinch valve according to claim 1, wherein the counter-bearing section is detachably connected to the closure element.

10. The pinch valve according to claim 1, wherein a contact contour of the closure element opposite the counter-bearing section and an inner contact contour of the main body rest against one another when the closure element is in the first position.

11. The pinch valve according to claim 1, wherein the compressor is detachably fastened to a valve rod extending along the actuating axis.

12. The pinch valve according to claim 1, wherein a fastening section of the main body is located radially outside of a passage opening for the or a valve rod.

13. The pinch valve according to claim 1, wherein the counter-bearing section opens in an opening which has a smaller diameter than an inner diameter of the counter-bearing section.

* * * * *